US012595881B2

(12) United States Patent (10) Patent No.: US 12,595,881 B2
Thomas et al. (45) Date of Patent: Apr. 7, 2026

(54) LUBRICATION SYSTEM

(71) Applicant: Kerr Machine Co., Sulphur, OK (US)

(72) Inventors: Micheal Cole Thomas, Azle, TX (US);
Christopher Todd Barnett, Stratford,
OK (US); Kelcy Jake Foster, Sulphur,
OK (US); Nicholas Son, Davis, OK
(US); John Keith, Ardmore, OK (US);
Guy J. Lapointe, Sulphur, OK (US);
Brandon Scott Ayres, Ardmore, OK
(US)

(73) Assignee: Kerr Machine Co., Sulphur, OK (US)

( * ) Notice: Subject to any disclaimer, the term of this
patent is extended or adjusted under 35
U.S.C. 154(b) by 0 days.

(21) Appl. No.: 19/015,887

(22) Filed: Jan. 10, 2025

(65) Prior Publication Data

US 2025/0230899 A1 Jul. 17, 2025

Related U.S. Application Data

(60) Provisional application No. 63/619,944, filed on Jan.
11, 2024.

(51) Int. Cl.
*F16N 7/38* (2006.01)
*F16N 23/00* (2006.01)
(52) U.S. Cl.
CPC .............. *F16N 7/38* (2013.01); *F16N 23/00*
(2013.01); *F16N 2280/00* (2013.01)
(58) Field of Classification Search
CPC ............. F16N 7/38; E21B 44/06; E21B 4/003
See application file for complete search history.

(56) References Cited

U.S. PATENT DOCUMENTS

| | | | | |
|---|---|---|---|---|
| 5,249,600 A | * | 10/1993 | Blume | F16K 15/06 |
| | | | | 137/902 |
| 8,317,498 B2 | * | 11/2012 | Gambier | F04B 53/1097 |
| | | | | 417/454 |
| 10,352,321 B2 | * | 7/2019 | Byrne | F04B 1/0404 |
| 11,566,718 B2 | * | 1/2023 | Singley | F16K 17/02 |
| 11,808,364 B2 | * | 11/2023 | Thomas | F16K 1/385 |
| 11,834,940 B1 | * | 12/2023 | Kohli | E21B 7/18 |
| 11,953,000 B2 | | 4/2024 | Foster et al. | |
| 12,000,257 B2 | | 6/2024 | Foster et al. | |
| 12,092,227 B1 | * | 9/2024 | Belshan | F16K 15/028 |

(Continued)

OTHER PUBLICATIONS

Grainger, "LDI Industries Precision Metering Lubrication System:
Oil, 0.5 gal Reservoir Capacity, 8 Feeds, NPT", undated, 2 pages,
retrieved from company website Feb. 10, 2025 (https://www.grainger.
com/product/LDI-INDUSTRIES-Precision-Metering-Lubrication-
1TMU1?opr=PLADS&analytics=FM%3APLA&a2c_sku_original=
1TMU3).

(Continued)

*Primary Examiner* — Anna M Momper
*Assistant Examiner* — Mark K Buse
(74) *Attorney, Agent, or Firm* — Tomlinson McKinstry,
P.C.

(57) ABSTRACT
A lubricating system configured to provide a lubricating oil
from a lubricant reservoir to a fluid end by use of a pump.
The lubricating system has a plurality of check valves that
each have an elastomeric insert. The lubricating system also
has at least one pressure relief valve that is configured to
re-rout lubricant to the lubricant reservoir when needed to
stabilize pressure within the system. The lubricating system
uses a pump drive controller and at least one sensor to
selectively turn the pump on and off.

19 Claims, 11 Drawing Sheets

(56)　　　　　References Cited

U.S. PATENT DOCUMENTS

| | | | | |
|---|---|---|---|---|
| 2011/0239856 A1* | 10/2011 | Tiller | ..................... | F04B 53/18 |
| | | | | 92/153 |
| 2012/0272764 A1* | 11/2012 | Pendleton | .............. | F04B 15/02 |
| | | | | 74/425 |
| 2016/0319805 A1* | 11/2016 | Dille | ....................... | F04B 11/00 |
| 2018/0238459 A1* | 8/2018 | Nowell | .................. | F16K 15/03 |
| 2020/0109610 A1* | 4/2020 | Husøy | .................. | F04B 9/1172 |
| 2021/0040836 A1* | 2/2021 | Baskin | ............... | E21B 43/2607 |
| 2023/0167728 A1* | 6/2023 | Marette | .................. | F04B 53/22 |
| | | | | 417/454 |

OTHER PUBLICATIONS

Bill Spitzer & Associates, "Lincoln Centro-Matic Packing Lube System for Trailer Mounted Frac Pump", Jan. 15, 2018, 7 pages, Houston, Texas, retrieved from company website Feb. 10, 2025 (https://www.billspitzerassoc.com/blog/2018/1/15/lincoln-centro-matic-packing-lube-system-for-trailer-mounted-frac-pump).
Interlube Systems Ltd "Ax Range Centralised Lubrication System Multi-Industry Applications", undated, 4 pages, Plymouth, Devon, England, retrieved from company website Feb. 10, 2025 (https://www.qpc-products.com/pdfs/interlube_ax.pdf).
Machinery Lubrication "The Importance of Check Valves in Hydraulic Systems", Apr. 2018, 10 pages, Noria, Tulsa, OK, retrieved from company website Feb. 10, 2025 (https://www.machinerylubrication.com/Read/31135/hydraulic-check-valves).
Lincoln Industrial, "Single and Manifold Type Injectors", Jan. 2007, 8 pages, St. Louis, MO, retrieved from company website Feb. 10, 2025 (https://files.valinonline.com/userfiles/documents/lincoln-model-85781-sl-v-injector-series-b-manual-2007.pdf).

* cited by examiner

LUBRICATION SYSTEM

SUMMARY

In at least one embodiment, the present invention is directed to a lubrication system. The lubrication system comprises a lubricant reservoir, a pump connected to the lubricant reservoir, a fluid end, a plurality of check valves interconnecting the pump and the fluid end, at least one first conduit interconnecting the plurality of check valves and the pump, at least one pressure relief valve, and a second conduit interconnecting the at least one pressure relief valve and the lubricant reservoir. The lubricant reservoir is configured to contain a lubricating medium. The pump contains a plurality of reciprocating lubricant plungers each configured to move the lubricating medium through the lubricating system. The fluid end comprises at least one reciprocating fluid end plunger.

In at least one embodiment, the present invention is also directed to a lubrication system. The lubrication system comprises a lubricant reservoir, a pump, a pump drive connected to the pump, a sensor configured to measure a physical characteristic and provide an output, a pump drive controller configured to selectively turn the pump drive on and off based on the output received from the sensor, a plurality of check valves, and at least one first conduit interconnecting the pump and the plurality of check valves. Each check valve comprises an elastomeric insert. The pump is configured to pressurize the lubricating medium and comprises at least one reciprocating plunger. The lubricant reservoir is configured to contain a lubricating medium, and is configured to transmit the lubricating medium from the lubricant reservoir to a fluid end through the plurality of check valves.

DETAILED DESCRIPTION

Figure 1:
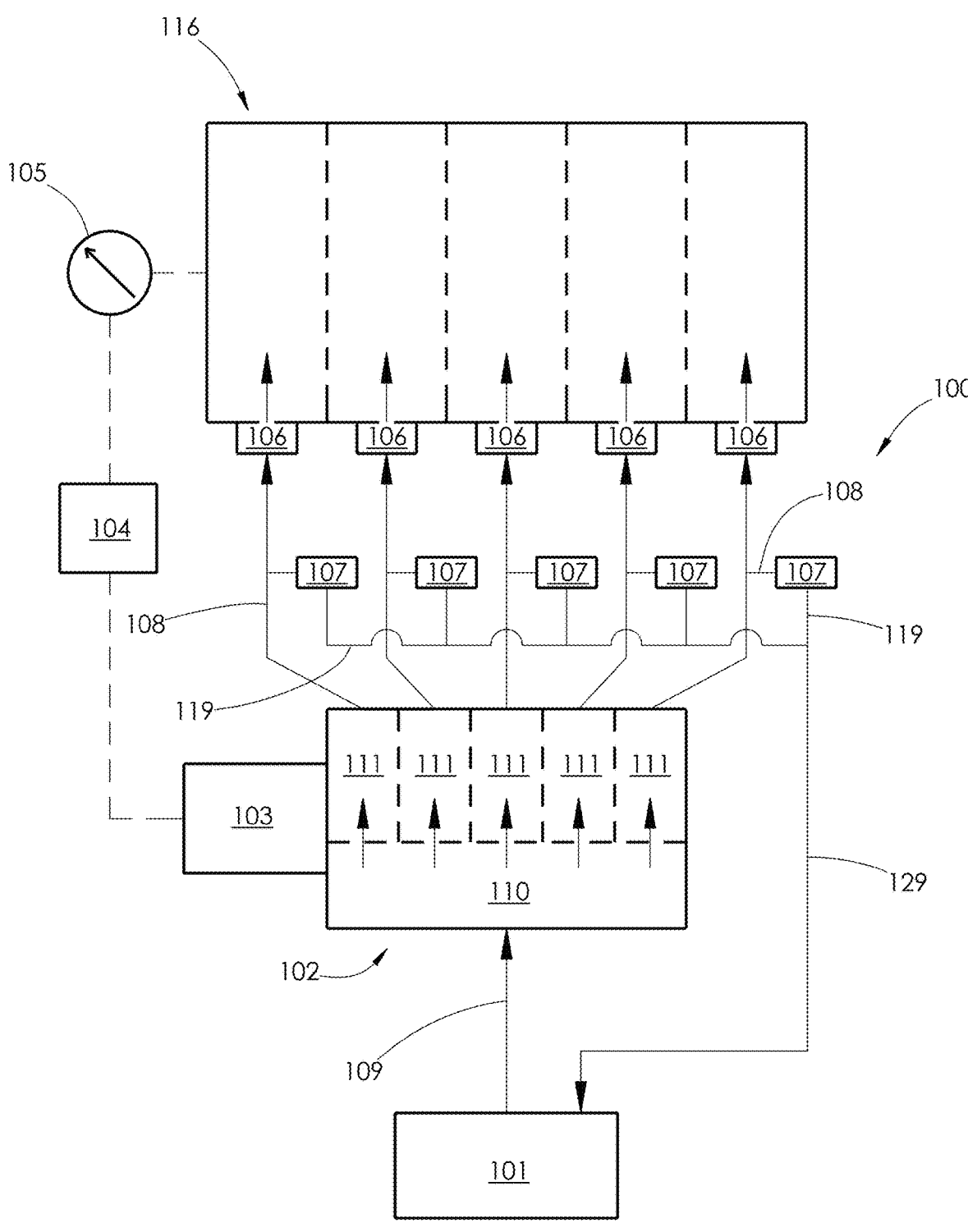
FIG. 1 is a top plan view of a lubrication system.

High-pressure reciprocating pumps typically comprise a power end assembly attached to a fluid end assembly. Fluid end assemblies are typically used in oil and gas operations to deliver highly pressurized corrosive and/or abrasive fluids to piping leading to the wellbore. The fluid ends are typically attached to power ends run by engines. The engines each have an engine crankshaft that is attached to a transmission input shaft. A transmission output shaft is connected to a gearbox input shaft, and a gearbox output shaft is attached to a power end crankshaft. The power end crankshaft reciprocates plungers within the fluid end assembly to pump fluid through the fluid end.

Fluid may be pumped through the fluid end at pressures that range from 5,000-15,000 pounds per square inch (psi). However, the pressure may reach up to 22,500 psi. Power ends typically have a power output of at least 2,250 horsepower during hydraulic fracturing operations. A single fluid end typically delivers a fluid volume of about 185-690 gallons per minute or 4-16 barrels per minute during a fracking operation. When a plurality of fluid ends are used together, the fluid ends may collectively deliver about 4,200 gallons per minute or 100 barrels per minute to the wellbore.

As described in U.S. Pat. No. 12,000,257, issued to Foster et al. (referred to as the '257 patent herein), the entire contents of which are incorporated herein by reference, lubrication is required to reduce friction between the reciprocating plungers and plunger packing. To facilitate the required lubrication, a lubrication port is formed in the rear retainer of each fluid end section for connection to an external lubrication system. The present disclosure describes various embodiments of an external lubrication system to meet the lubrication requirements of the plungers and plunger packings in the above-mentioned fluid end or any other fluid ends or similar systems requiring such lubrication.

Traditionally, high-pressure pump assemblies including fluid ends use complex lubrication systems that tend to fail when exposed to sand and debris found in the surrounding environment. The debris clogs the lubrication systems' valves and injectors. This is even more common when the lines and hoses within such lubrication systems are dropped on the ground, or exposed to windy conditions blowing debris into the lubrication system's reservoir. The size of the check valves used within such existing lubrication systems amplifies the struggles caused by the debris, as the slightest amount of debris results in the valves functioning incorrectly. Further, the metal-to-metal sealing surfaces of the existing check valves fail when sand or debris gets in between the sealing surfaces. There is thus a need in the industry for a more efficient lubricating system that will not succumb to failure when exposed to sand and debris.

Another challenge within existing lubricating systems is the lack of ability to selectively activate and deactivate the systems. Operators traditionally may program cycling systems for certain time periods, but the amount of time needed becomes more of an estimate than a command. It is not uncommon for operators to put such lubrication systems into a manual mode where the system just sends a continuous output of lubricant to the fluid end. This can cause a multitude of issues such as excessive lubricant pressures and waste. There is thus also a need in the industry for a lubrication system that is capable of selectively activating and deactivating its lubricant pump based on sensed outputs.

The present disclosure aims to address these issues by providing a lubrication system that includes larger check valves than the prior art. These larger check valves use inserts which prevent failure from sand, sediment, or debris in the lines. The inserts are ideally made of non-metallic materials such as elastomers or urethane. The lubrication system also uses at least one sensor, which is connected to a pump drive controller. The pump drive controller may use physical characteristics or physical parameters measured by the at least one sensor to determine when to turn on and off the lubrication system's pump. This effectively saves time and money by lowering the risk of excessive lubricant pressures in the hoses or lines, and reducing waste.

Turning to FIGS. 1-6, one embodiment of a lubrication system 100 is shown. The lubrication system 100 comprises a lubricant reservoir 101, a pump 102, a pump drive 103, a pump drive controller 104, one or more sensors 105, a plurality of check valves 106, a plurality of pressure relief valves 107, a plurality of high-pressure conduits or high-pressure hoses 108, a plurality of low-pressure conduits or low-pressure hoses 109, a plurality of low-pressure return conduits or low-pressure return hoses 119, a single low-pressure return conduit or single low-pressure return hose 129, and a lubricant or lubricating medium (not shown). The lubrication system 100 is configured to be connected to a fluid end 116. The lubricant used in this embodiment has a relatively low viscosity to encourage greater volume flow at lower system pressures. The lubricant may be a variety of things such as a lubricating oil or lubricating grease.

The pump 102 may be a positive displacement pump and comprises an intake manifold 110 and a plurality of plungers 111. One such positive displacement pump that illustrates the concepts described herein is the KD-1250BC manufactured by Kerr Pumps. The pump 102 may be configured to have differing numbers of reciprocating lubricant plungers 111. Each plunger 111 may be surrounded by a plunger packing comprising one or more annular packing seals, as is used in traditional fluid ends. The plunger packing may be made of many materials such as elastomers including Kevlar. Such packing prevents the plungers 111 from getting clogged or stuck as traditional metal-to-metal plunger/injector systems do when subjected to debris.

Reciprocation of the plungers 111 may be powered by a crankshaft, like the ones associated with traditional fluid ends and power ends known in the art. The pump 102 may further comprise suction and discharge valves having elastomeric sealing surfaces instead of metal-to-metal sealing surfaces. The sealing surfaces may comprise non-metal inserts. The use of packing seals and elastomeric sealing surfaces within the pump 102 allows the pump to continue operating efficiently even if environmental debris gets into the pump 102 during operation.

Figure 2:
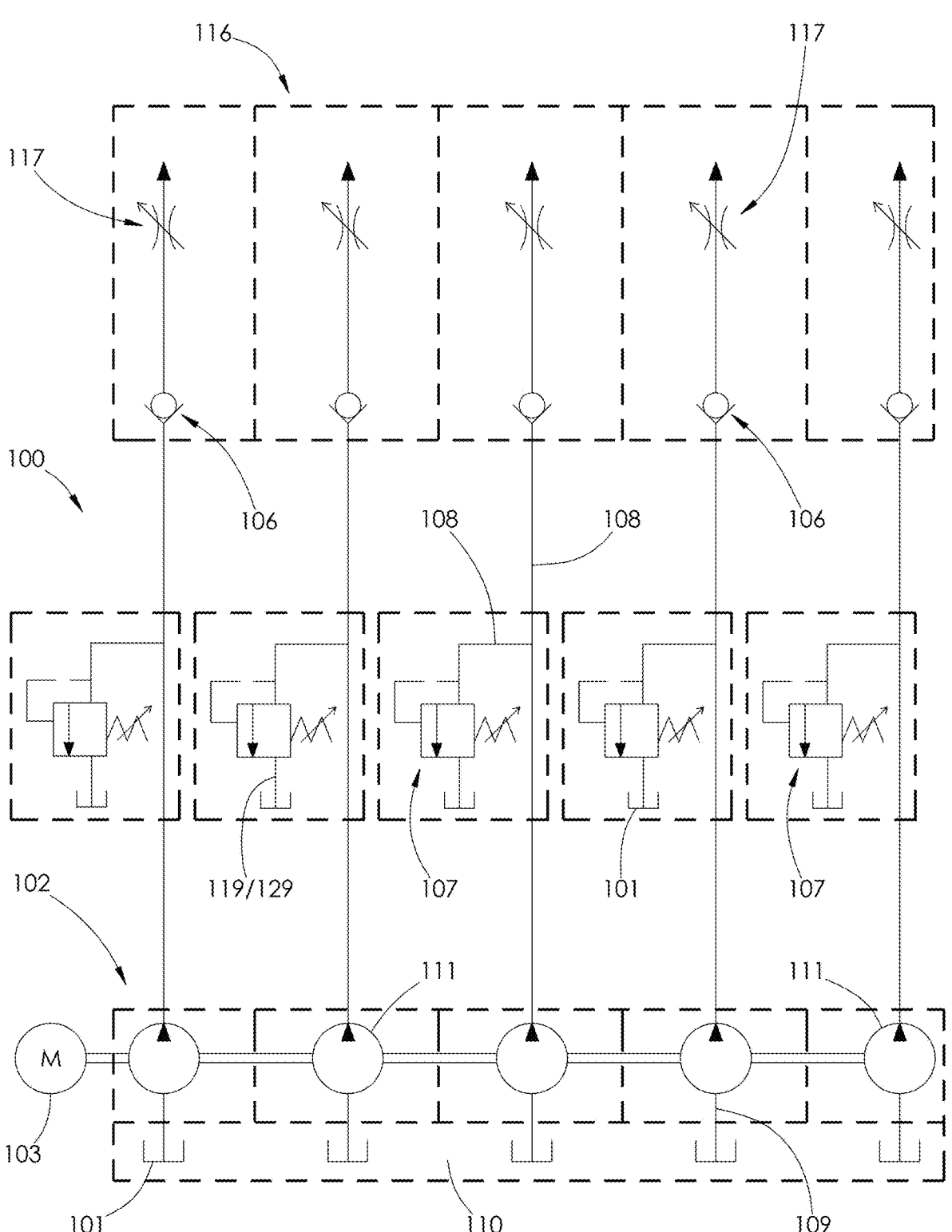
FIG. 2 is a hydraulic schematic view of the lubrication system shown in FIG. 1. The physical components of the lubrication system are shown in dashed lines.
Figures 3, 4:
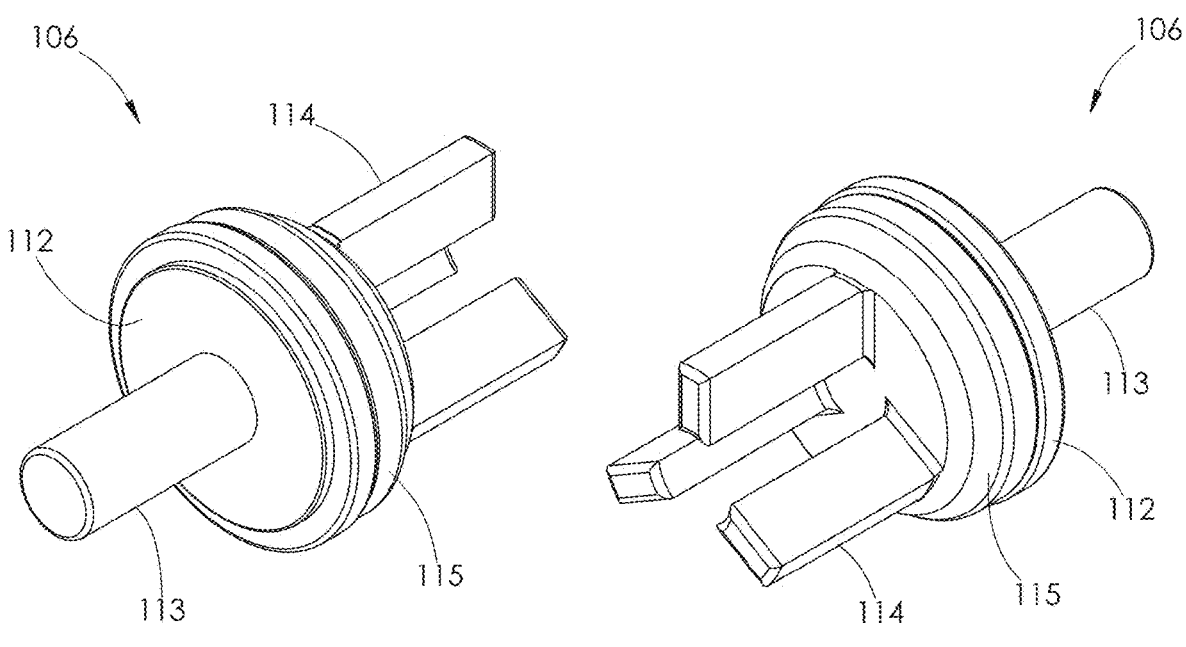
FIG. 3 is a front perspective view of a check valve that may be used in the lubrication system shown in FIG. 1.
FIG. 4 is a rear perspective view of the check valve shown in FIG. 3.
Figures 5, 6:
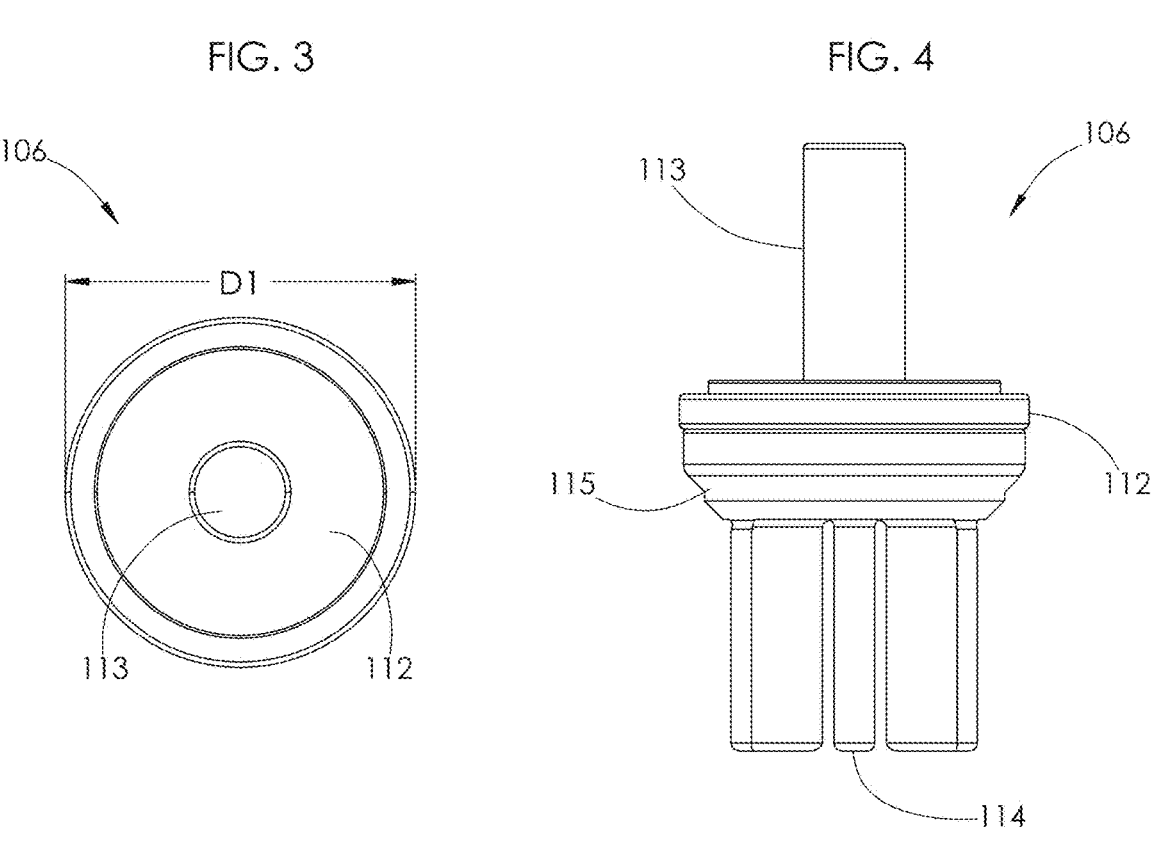
FIG. 5 is a top plan view of the check valve shown in FIG. 3.
FIG. 6 is a side elevation view of the check valve shown in FIG. 3.

In this embodiment, the pump 102 has the same number of plungers 111 as there are fluid end sections of the fluid end 116 being lubricated. Each plunger 111 may be isolated hydraulically to act as an individual pump with common inputs via the reservoir 101 and intake manifold 110, and separate outputs, on a one-to-one basis, to each of the fluid end sections of the fluid end 116. To illustrate the hydraulic isolation of each plunger 111, FIG. 2 shows each plunger 111 as a separate pump symbol.

The pump drive 103 is shown as an electric motor in this embodiment, however it may be a hydraulic motor, internal combustion engine, or any other type of driver. The schematic representation of the pump drive 103 as shown in FIG.

2 illustrates that a single pump drive 103 provides power to all the plungers 111 of the pump 102, as indicated by the connecting shaft between each schematic pump symbol 111.

The pump drive controller 104 receives output from the one or more sensors 105. Applying preprogrammed logic to the output, the pump drive controller 104 determines if the pump drive 103 should be on (activated) or off (deactivated) and sends the appropriate signal to the pump drive 103.

The one or more sensors 105 may measure any physical characteristic or physical parameter of the lubrication system 100 and/or high-pressure pump and/or the environment. In this embodiment, one sensor 105 is shown measuring a characteristic of the fluid end 116. The sensor 105 shown in FIG. 1 is a pressure sensor. As discussed below, there may be multiple sensors 105 measuring multiple things and providing multiple outputs to the pump drive controller 104.

Referring now to FIGS. 3-6, a check valve 106 is shown. The check valve 106 comprises a body 112, a guide stem 113, legs 114, and an insert 115. The insert 115 is situated within a groove formed in the body 112, and is made of a non-metallic material such as an elastomer or urethane. The addition of the insert 115 creates a more robust seal than traditional metal-to-metal seals seen in traditional check valves. This allows the check valve 106 to still seal properly even when subjected to small particles and contaminants such as sand. In this embodiment, check valves 106 are either physically attached to the exterior of the fluid end 116 or installed internally within it. Additionally, there are the same number of check valves 106 as plungers 111 on a one-to-one basis. Notably, the diameter of the check valves 106 is larger by an order of magnitude than typical prior art check valves. In one example of prior art check valves, the diameter may be as small as 0.100 inches. Meanwhile, the check valves 106 used in the current system 100 may have a diameter, D1, of 1.25 inches. This allows a larger particle size of lubricant contaminants within the system without compromising the function of the check valve 106. Other advantages of the check valve 106 are discussed more herein.

The pressure relief valves 107 are normally closed, pilot operated, adjustable spring return valves as are standard in the industry. In this embodiment, the pressure relief valves 107 are physically separate from the other components of the lubrication system 100, as shown in FIG. 1. Additionally, there are the same number of pressure relief valves 107 as plungers 111 on a one-to-one basis.

The high-pressure hoses 108 are typical hydraulic hoses well known in the industry. In this embodiment, the high-pressure hoses 108 may be rated to withstand up to 3,000 pounds per square inch. There may be multiple high-pressure hoses 108 of varying lengths as needed to facilitate the assembly of the lubrication system 100.

The low-pressure hoses 109 and low-pressure return hoses 119 and 129 are typical hydraulic hoses well known in the industry. In this embodiment, the low-pressure hoses 109 and low-pressure return hoses 119 and 129 may be rated up to 300 pounds per square inch. There may be multiple low-pressure hoses 109 of varying lengths as needed to facilitate the assembly of the lubrication system 100.

To assemble the lubrication system 100, a low-pressure hose 109 connects the lubricant reservoir 101 to the pump 102. High-pressure hoses 108 further connect the output of each plunger 111 of the pump 102 to a corresponding check valve 106 that is attached directly to the lubrication port of each fluid end section on a one-to-one basis. Additional high-pressure hoses 108 also tee into each of the aforementioned high-pressure hoses 108. Each of these additional high-pressure hoses 108 connects to the inlet of one of the plurality of pressure relief valves 107 to the prior-mentioned high-pressure hoses 108 on a one-to-one basis. A plurality of low-pressure return hoses 119 connect the outlets of each pressure relief valve 107 to a single low-pressure return hose 129, which further connects to the reservoir 101. The pressure relief valves 107 are configured to allow a decrease in lubricant pressure, as discussed herein.

In this embodiment, the plurality of low-pressure return hoses 119 connect together to form a single low-pressure return hose 129 to return lubricant to the reservoir 101. However, in alternative embodiments, there may be separate low-pressure return hoses 119 connecting the outlet of each pressure relief valve 107 directly to the reservoir 101. Other than the check valves 106, which are attached directly to the fluid end 116, the other components of the lubrication system 100 may be mounted on the fluid end 116 separately or as a unit.

In operation, the one or more sensors 105 measure a desired quantity or state of some operational characteristic of the high pressure pump and/or the lubrication system 100 and/or the operating environment. For example, the operational characteristic may be the number of strokes of a reciprocating plunger of a corresponding fluid end section. Once a threshold value is reached for the desired quantity or state, the pump drive controller 104 activates the pump drive 103 for a predetermined amount of time or until the threshold value is no longer reached. In the above example, once 1,000 strokes of the plunger is counted by the sensor 105, the pump drive controller 104 activates the lubrication system 100 for ten seconds and resets the counter value to zero.

Another example may be measuring the pressure in one or more of the high-pressure hoses 108 and activating the lubrication system 100 when the pressure is measured to be less than a threshold value, and then deactivating the lubrication system 100 when the pressure is measured to be above the threshold value.

Another example may be to measure the temperature of the plunger or some other component within the fluid end 116. Prior to the temperature reaching a level detrimental to the life of the plunger packing, the controller activates the lubrication system 100 until the measured temperature reduces to a predetermined value.

The simplest control scheme is to activate the lubrication system 100 for a certain period of time when necessary. Multiple sensors 105 may be used to measure multiple characteristics, and logic may be used to determine if the lubrication system 100 needs to be activated or not. For instance, one sensor 105 may be used to monitor air temperature and another to monitor the temperature of the fluid end section housing. The pump drive controller 104 may activate and deactivate the lubrication system 100 based on the temperature difference.

Further during operation, when the lubrication system 100 is activated, a plurality of groupings each act as an isolated hydraulic circuit, with all the independent circuits having a common reservoir 101. Each grouping comprises a plunger 111, a check valve 106, a pressure relief valve 107, and their connecting high-pressure hoses 108. The lubricant pumped by a single plunger 111 in the pump 102 is delivered to a lubrication port of a single plunger within the fluid end 116. If a restriction 117 in the circuit causes the pressure to increase beyond a predetermined limit, the pressure relief valve 107 will activate and the lubricant will flow directly back to the reservoir 101 without damaging the components in that particular fluid end section. The advantage of this is that all the other fluid end sections will continue to receive full lubricant flow since their hydraulic circuits are isolated from the others.

Another benefit of the system 100 is that the check valves 106 positively stop flow when desired, even in the presence of contamination. Since the check valve insert 115 is made of a non-metallic substance, any contaminants within the sealing area of the check valve 106 will be enveloped by the insert 115 as the insert 115 deflects around the contaminant while the remaining non-deflected portions of the insert 115 seal against the sealing area. This is in contrast to traditional lubrication systems that have metal to metal contacts in the sealing area, where any contaminant between the check valve and sealing surface blocks the check valve open and allows lubricant to flow back toward the pump and not into the plunger packing, or vice versa.

Figure 7:
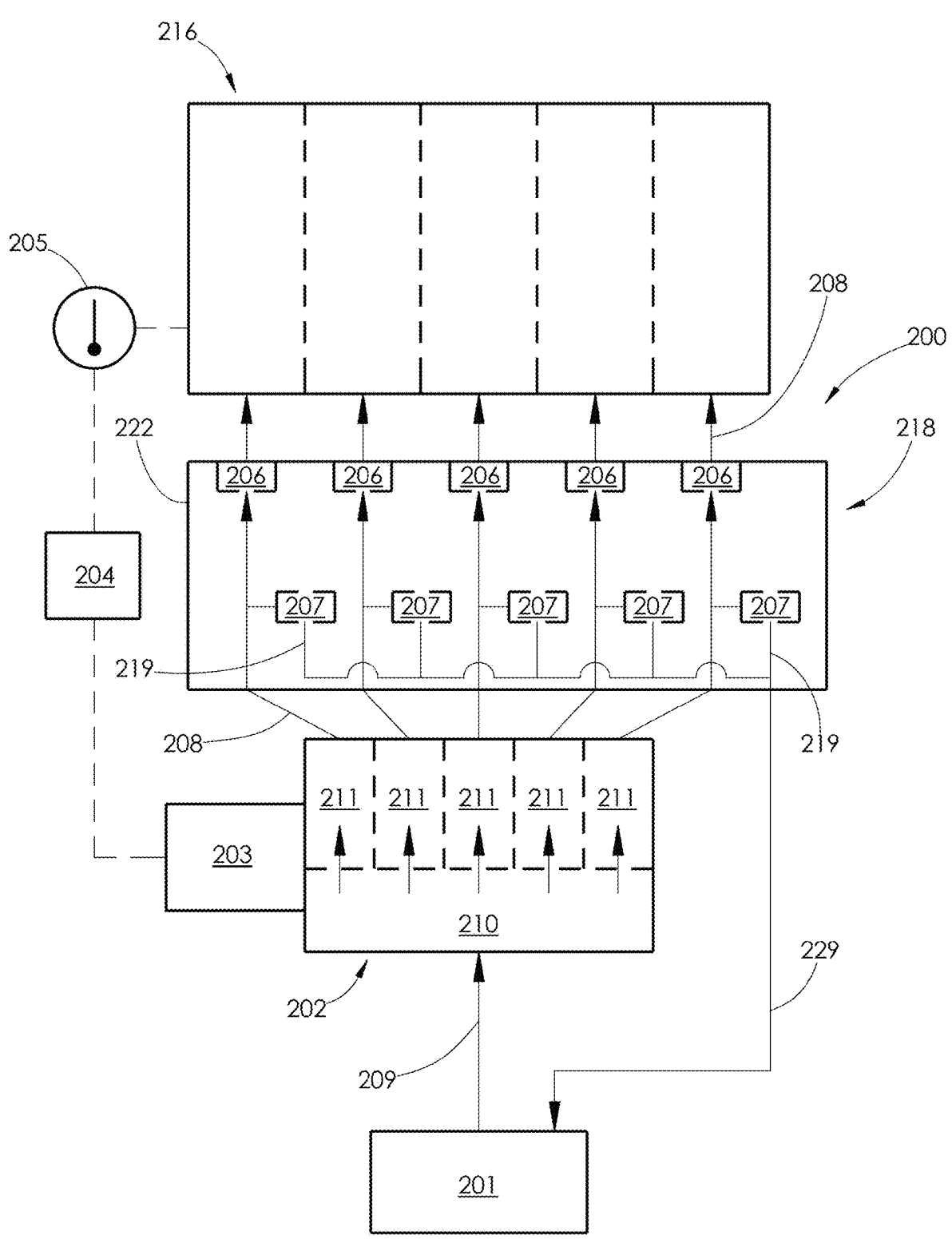
FIG. 7 is a top plan view of another embodiment of a lubrication system.
Figure 8:
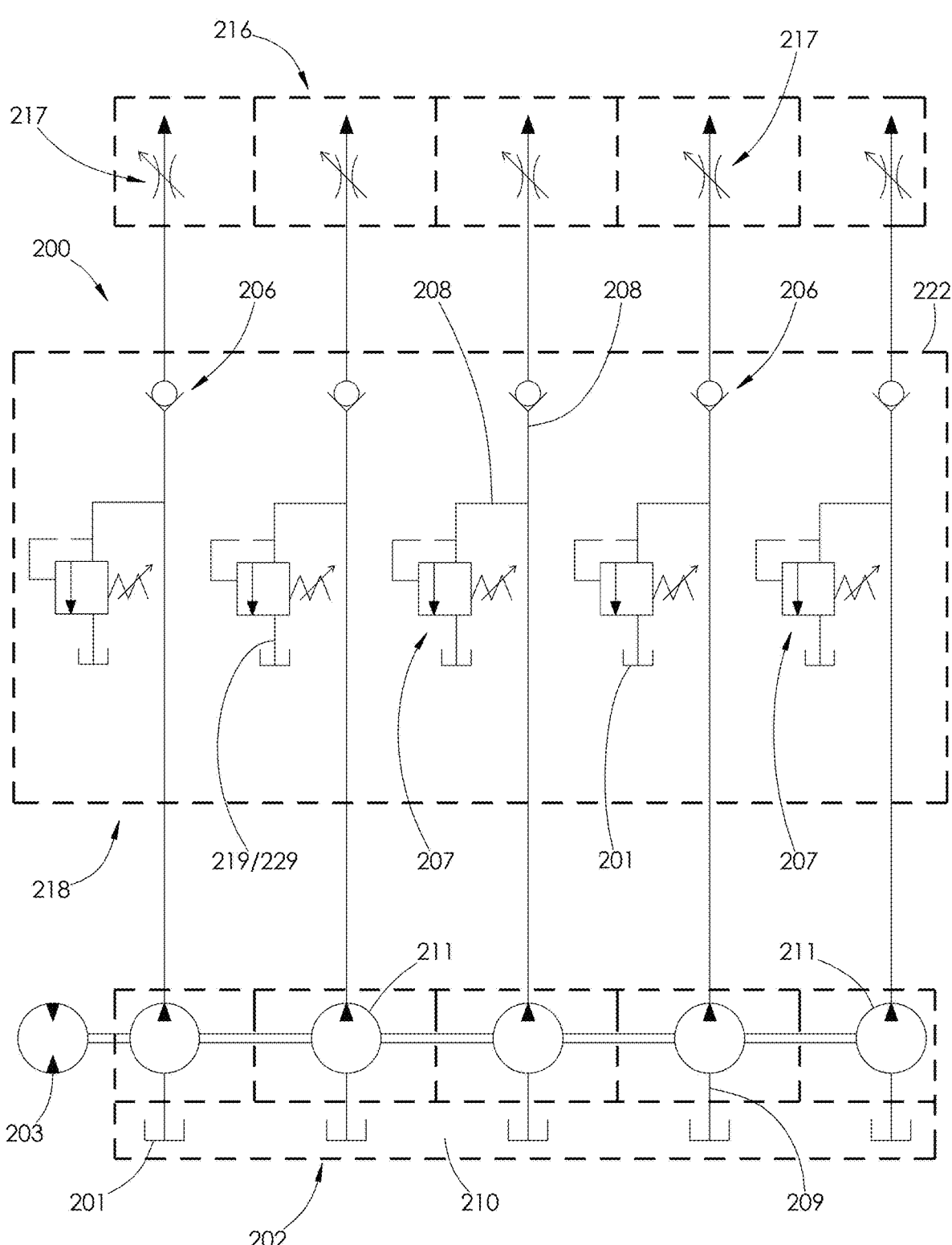
FIG. 8 is a hydraulic schematic view of the lubrication system shown in FIG. 7. The physical components of the lubrication system are shown in dashed lines.

Referring now to FIGS. 7 and 8, another embodiment of a lubrication system 200 is shown. The lubrication system 200 comprises a lubricant reservoir 201, a pump 202, a pump drive 203, a pump drive controller 204, one or more sensors 205, a plurality of high-pressure conduits or high-pressure hoses 208, a plurality of low-pressure conduits or low-pressure hoses 209, a plurality of low-pressure return conduits or low-pressure return hoses 219, a single low-pressure return conduit or low-pressure return hose 229, a check/relief manifold 218, and a lubricant or lubricating medium (not shown). The lubrication system 200 is configured to be connected to a fluid end 216. The lubricant used in this embodiment has a relatively low viscosity to encourage greater volume flow at lower system pressure. The lubricant may be a variety of things such as a lubricating oil or a lubricating grease.

The pump 202 may be a positive displacement pump and comprises an intake manifold 210 and a plurality of plungers 211. The pump 202 is similar to the pump 102 in that it performs the same function in the same manner. The pump 202 also has the same number of plungers 211 as there are fluid end sections of the fluid end 216 that is being lubricated. However, the pump 202 may differ from the pump 102 in fit or form to accommodate the differences between lubrication system 100 and lubrication system 200.

The pump drive 203 is shown as a hydraulic motor in this embodiment, however it may be an electric motor, internal combustion engine, or any other type of driver. The schematic representation of the pump drive 203 as shown in FIG. 8 illustrates that a single pump drive 203 provides power to all the plungers 211 of the pump 202, as indicated by the connecting shaft between each schematic pump symbol 211.

The pump drive controller 204 receives output from the one or more sensors 205. Applying preprogrammed logic to the output, the pump drive controller 204 determines if the pump drive 203 should be on or off and sends the appropriate signal to the pump drive 203.

The one or more sensors 205 may measure any physical characteristic or physical parameter of the lubrication system 200 and/or high-pressure pump and/or the environment. In this embodiment, one sensor 205 is shown measuring a characteristic of the fluid end 216. Also in this embodiment, the sensor 205 shown in FIG. 7 is a temperature sensor. As discussed above, there may be multiple sensors 205 measuring multiple things and providing multiple outputs to the pump drive controller 204.

The high-pressure hoses 208, low-pressure hoses 209, and low-pressure return hoses 219 and 229 are similar to the high-pressure hoses 108, low-pressure hoses 109, and low-pressure return hoses 119 and 129 in that they perform the same functions in the same manner. However, due to the differences in the lubrication system 200 from lubrication system 100, there may be changes to the fit, form and/or number of hoses 208, 209, 219, 229 as compared to the hoses 108, 109, 119, 129 of lubrication system 100.

Referring now to FIG. 7, the check/relief manifold 218 comprises a body 222, a plurality of check valves 206, and a plurality of pressure relief valves 207. In this embodiment, the plurality of check valves 206 and the plurality of pressure relief valves 207 are mounted to the exterior of the check/relief manifold 218 or installed internally within it.

The check valves 206 are similar to the check valves 106 in that they each comprise a guide stem, a body, legs, and an insert, and they perform the same function in the same manner, providing the same advantages as the check valves 106. However, as a result of the check valves 206 being mounted to the exterior of the check/relief manifold 218 or installed internally within it, the check valves 206 may differ in fit or form from check valves 106. Also in this embodiment, there are the same number of check valves 206 as plungers 211 on a one-to-one basis.

The pressure relief valves 207 are similar to pressure relief valves 107 in that they perform the same function in the same manner. However, because the pressure relief valves 207 are mounted to the exterior of the check/relief manifold 218 or installed internally within it, the pressure relief valves 207 may differ in fit or form from pressure relief valves 107. Also in this embodiment, there are the same number of pressure relief valves 207 as plungers 211 on a one-to-one basis.

To assemble the lubrication system 200, a low-pressure hose 209 connects the reservoir 201 to the pump 202. High-pressure hoses 208 further connect the output of each plunger 211 of the pump 202 to the check/relief manifold 218, and to an inlet of a corresponding check valve 206. The check/relief manifold 218 is constructed so that the hydraulic circuit from the output of each plunger 211 to the inlet of each lubrication port on the fluid end 216 is isolated from the other hydraulic circuits. High-pressure hoses 208 also connect an outlet of each check valve 206 to lubrication ports on the fluid end 216 on a one-to-one basis.

In this embodiment, the outlets of the plurality of pressure relief valves 207 each connect to low-pressure return hoses 219, which then combine within the check/relief manifold 218 and exit the check/relief manifold 218 through a single port. A single low-pressure return hose 229 connects the single port of the check/relief manifold 218 to the reservoir 201. In alternative embodiments, there may be separate ports formed for each pressure relief valve 207. In these cases, there may be separate low-pressure return hoses 229 connecting each of the separate ports to the reservoir 201.

The reservoir 201, pump 202, pump drive 203, pump drive controller 204, one or more sensors 205, and check/relief manifold 218 may be mounted on the same conveyance as the fluid end 216 separately or as a unit. Depending on the type of pump drive 203 used, the pump drive 203 may be mounted to the pump 202. Also, depending on the types of sensors 205 used, one or more sensors 205 may be mounted to the fluid end 216.

In operation, the one or more sensors 205 and the pump drive controller 204 are used to activate and deactivate the pump drive 203 in a similar fashion as the one or more sensors 105 and pump drive controller 104 discussed above. In this embodiment, the sensor 205 is a temperature sensor monitoring the temperature of the fluid end plunger.

As can be seen by comparing FIG. 2 to FIG. 8, the hydraulic circuit for this embodiment is the same as that of the previous embodiment and provides the same advantages as the previous embodiment. Specifically, that the lubricant pumped by a single plunger 211 in the pump 202 is delivered to the lubrication port of a single plunger of a fluid end section. If a restriction 217 in the circuit causes the pressure to increase beyond a predetermined limit, the pressure relief valve 207 will activate and the lubricant will flow directly back to the reservoir 201 without damaging the components in that particular fluid end section. This provides an advantage in that all the other fluid end sections will continue to receive full lubricant flow since their hydraulic circuits are isolated from the others. The primary difference between the two embodiments 100 and 200 is the addition of the check/relief manifold 218. The check/relief manifold 218 may simplify assembly by reducing the number and/or lengths of high-pressure hoses 208 and/or low-pressure hoses 209.

Figure 9:
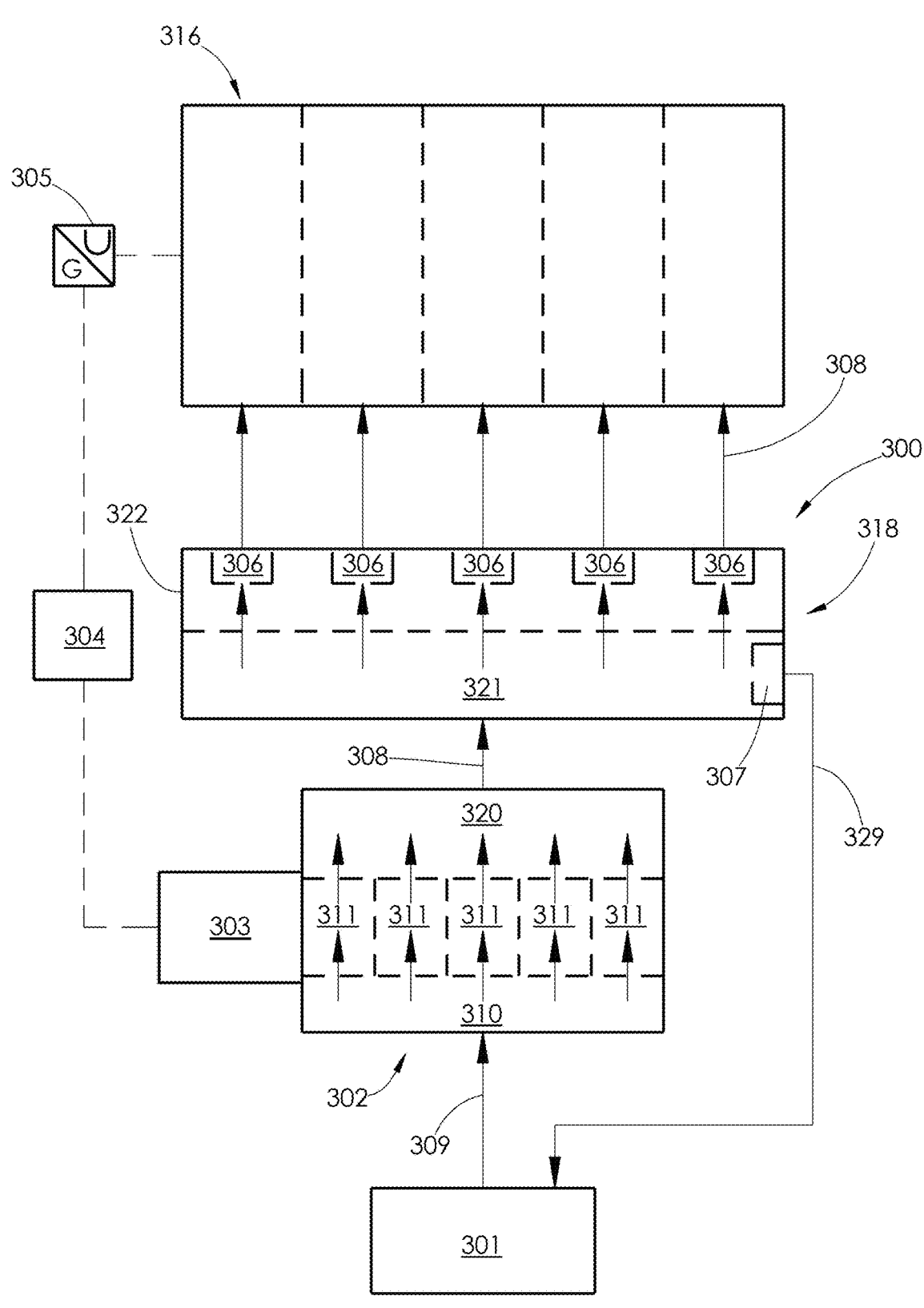
FIG. 9 is a top plan view of another embodiment of a lubrication system.
Figure 10:
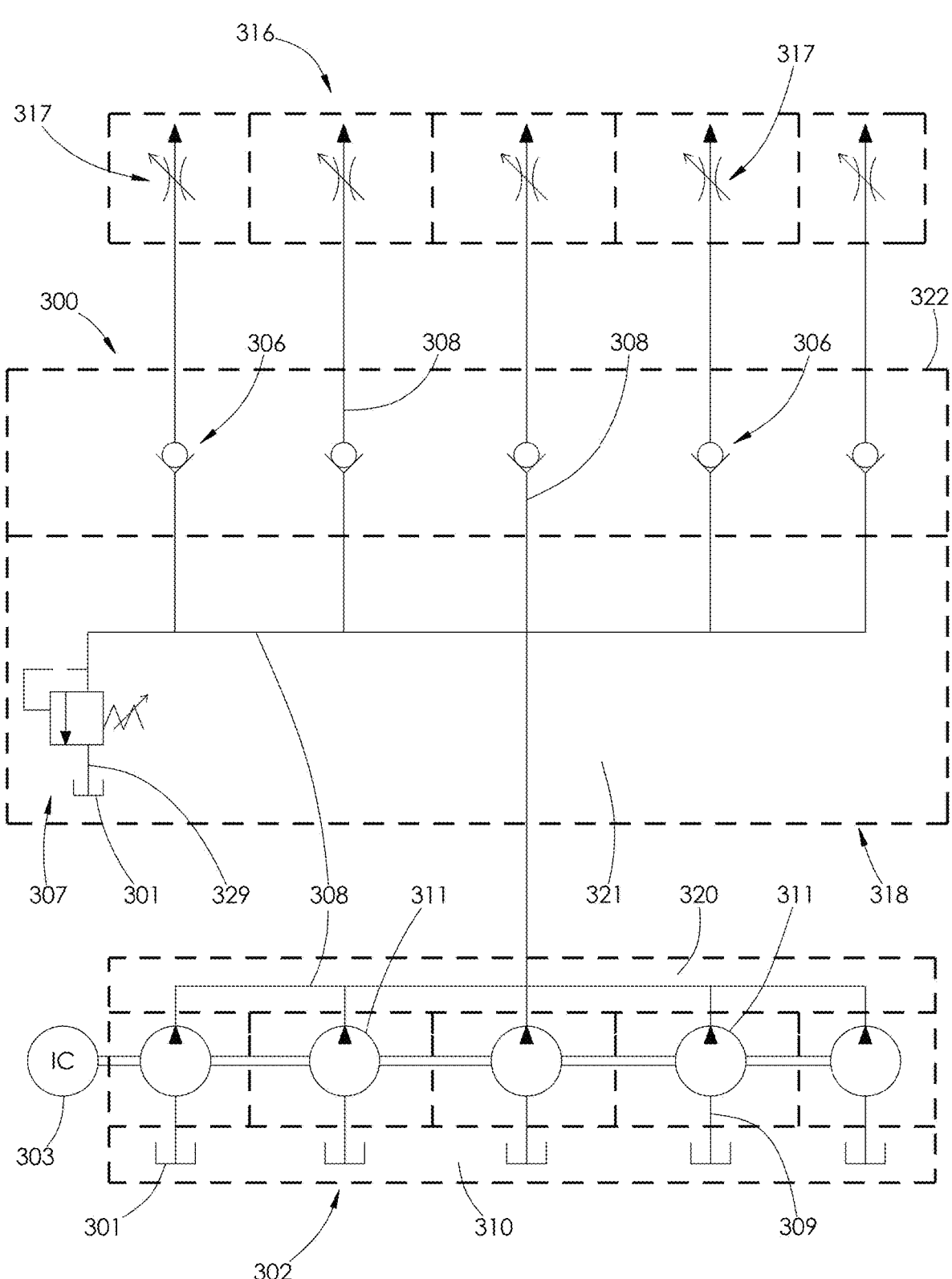
FIG. 10 is a hydraulic schematic view of the lubrication system shown in FIG. 9. The physical components of the lubrication system are shown in dashed lines.

Referring now to FIGS. 9-10, another embodiment of a lubrication system 300 is shown. The lubrication system 300 comprises a lubricant reservoir 301, a pump 302, a pump drive 303, a pump drive controller 304, one or more sensors 305, a plurality of high-pressure conduits or high-pressure hoses 308, a plurality of low-pressure conduits or low-pressure hoses 309, a low-pressure return conduit or low-pressure return hose 329, a check/relief manifold 318, and a lubricant or lubricating medium (not shown). The lubrication system 300 is configured to be connected to a fluid end 316. The lubricant used in this embodiment has a relatively low viscosity to encourage greater volume flow at lower system pressure. The lubricant may be many things such as a lubricating oil or a lubricating grease.

The pump 302 may be a positive displacement pump and comprises an intake manifold 310, a plurality of plungers 311, and a discharge manifold 320. As with pumps 102 and 202, lubricant enters the pump 302 via an intake manifold 310, from which all the plungers 311 draw lubricant. The pump 302 also has the same number of plungers 311 as there are fluid end sections of the fluid end 316 that is being lubricated. The pump 302 differs from pumps 102 and 202 in that the plungers 311 discharge the pressurized lubricant into a common chamber or discharge manifold 320. Lubricant exits the pump 302 through a single outlet, shown in FIG. 9. A high-pressure hose 308 connects this single outlet and a single inlet of the check/relief manifold 318.

The pump drive 303 is shown as an internal combustion engine in this embodiment, however it may be an electric motor, hydraulic motor, or any other type of driver. The schematic representation of the pump drive 303 as shown in FIG. 10 illustrates that a single pump drive 303 provides power to all the plungers 311 of the pump 302, as indicated by the connecting shaft between each schematic pump symbol 311.

The pump drive controller 304 receives output from the one or more sensors 305. Applying preprogrammed logic to the output, the pump drive controller 304 determines if the pump drive 303 should be on or off and sends the appropriate signal to the pump drive 303.

The one or more sensors 305 may measure any physical characteristic or physical parameter of the lubrication system 300 and/or high-pressure pump and/or the environment. In this embodiment, one sensor 305 is shown measuring a characteristic of the fluid end 316. Also in this embodiment, the sensor 305 shown in FIG. 9 is a linear transducer. As discussed above, there may be multiple sensors 305 measuring multiple things and providing multiple outputs to the pump drive controller 304.

The high-pressure hoses 308, low-pressure hoses 309, and low-pressure return hose 329 are similar to the high-pressure hoses 108, low-pressure hoses 109, and low-pressure return hose 129 in that they perform the same functions in the same manner. However, due to the differences in the lubrication system 300 from lubrication system 100, there may changes to the fit, form and/or number of hoses 308, 309, 329 as compared to the hoses 108, 109, 129 of lubrication system 100.

Referring now to FIG. 9, the check/relief manifold 318 comprises a body 322, a plurality of check valves 306, a pressure relief valve 307, and an intake manifold 321. In this embodiment, the plurality of check valves 306 and the pressure relief valve 307 are mounted to the exterior of the check/relief manifold 318 or installed internally within it. In contrast to check/relief manifold 218, the check relief manifold 318 has a single inlet for the lubricant. That single inlet directs fluid into the intake manifold 321 of the check/relief manifold 318 from which all the check valves 306 draw lubricant.

The check valves 306 are similar to check valves 106 in that they each comprise a guide stem, a body, legs, and an insert, and they perform the same function in the same manner, providing the same advantages as check valves 106. However, as a result of the check valves 306 being mounted to the exterior of the check/relief manifold 318 or installed internally within it, the check valves 306 may differ in fit or form from check valves 106. Also in this embodiment, there are the same number of check valves 306 as plungers in the fluid end 316 on a one-to-one basis.

The pressure relief valve 307 is similar to pressure relief valve 107 in that it performs the same function in the same manner. However, since there is only one pressure relief valve 307 in this lubrication system 300, there is only a single low-pressure return conduit 329 extending from the intake manifold 321. Further, because the pressure relief valve 307 is mounted to the exterior of the check/relief manifold 318 or installed internally within it, the pressure relief valve 307 may differ in fit or form from pressure relief valves 107.

To assemble the lubrication system 300, a low-pressure hose 309 connects the reservoir 301 to the pump 302. A single high-pressure hose 308 further connects the outlet of the discharge manifold 320 of the pump 302 to the inlet of the intake manifold 321 of the check/relief manifold 318. The check/relief manifold 318 is constructed so that the hydraulic circuits from the output of each plunger 311 to the inlet of each lubrication port on the fluid end 316 are not isolated from the other hydraulic circuits. High-pressure hoses 308 connect the outlet of each check valve 306 to the lubrication ports on the fluid end 316 on a one-to-one basis.

As discussed above, the flow from the single pressure relief valve 307 exits the check/relief manifold 318 through a single low-pressure outlet. A low-pressure return hose 329 connects the single low-pressure outlet of the check/relief manifold 318 to the reservoir 301. The reservoir 301, pump 302, pump drive 303, pump drive controller 304, one or more sensors 305, and check/relief manifold 318 may be mounted on the same conveyance as the fluid end 316 separately or as a unit. Depending on the type of pump drive 303 used, the pump drive 303 may be mounted to the pump 302. Also, depending on the types of sensors 305 used, one or more sensors 305 may be mounted to the fluid end 316.

In operation, the one or more sensors 305 and the pump drive controller 304 are used to activate and deactivate the pump drive 303 in a similar fashion as the one or more sensors 105 and pump drive controller 104 are used to activate and deactivate pump drive 103. In this embodiment, the sensor 305 is a linear transducer monitoring the position of a plunger in the fluid end 316. Detection of movement by the linear transducer indicates to the pump drive controller 304 that the fluid end 316 is active. When the pump drive controller 304 receives the signal that the pump drive 303 is active, the pump drive controller 304 starts a timer. When the timer reaches a predetermined value, the pump drive controller 304 deactivates the pump drive 303, thus beginning another timer that activates the pump drive 303 when it reaches a predetermined value.

Referring now to FIG. 10, the hydraulic circuit for this embodiment shows that the lubricant pumped by the pump 302 is combined and delivered at a common pressure to the intake manifold 321 of the check/relief manifold 318. Since no two plunger packings are the same, there are different restrictions 317. The result of different restrictions 317 in this system is that the highest restriction 317 will receive the smallest amount of lubricant. However, setting the pressure relief valve 307 at the correct setting will facilitate adequate flow to all the plunger packings. The advantage of this system is a reduction in cost by eliminating multiple pressure relief valves 307 and additional high-pressure hoses 308 as compared to lubrication systems 100, 200.

Figure 11:
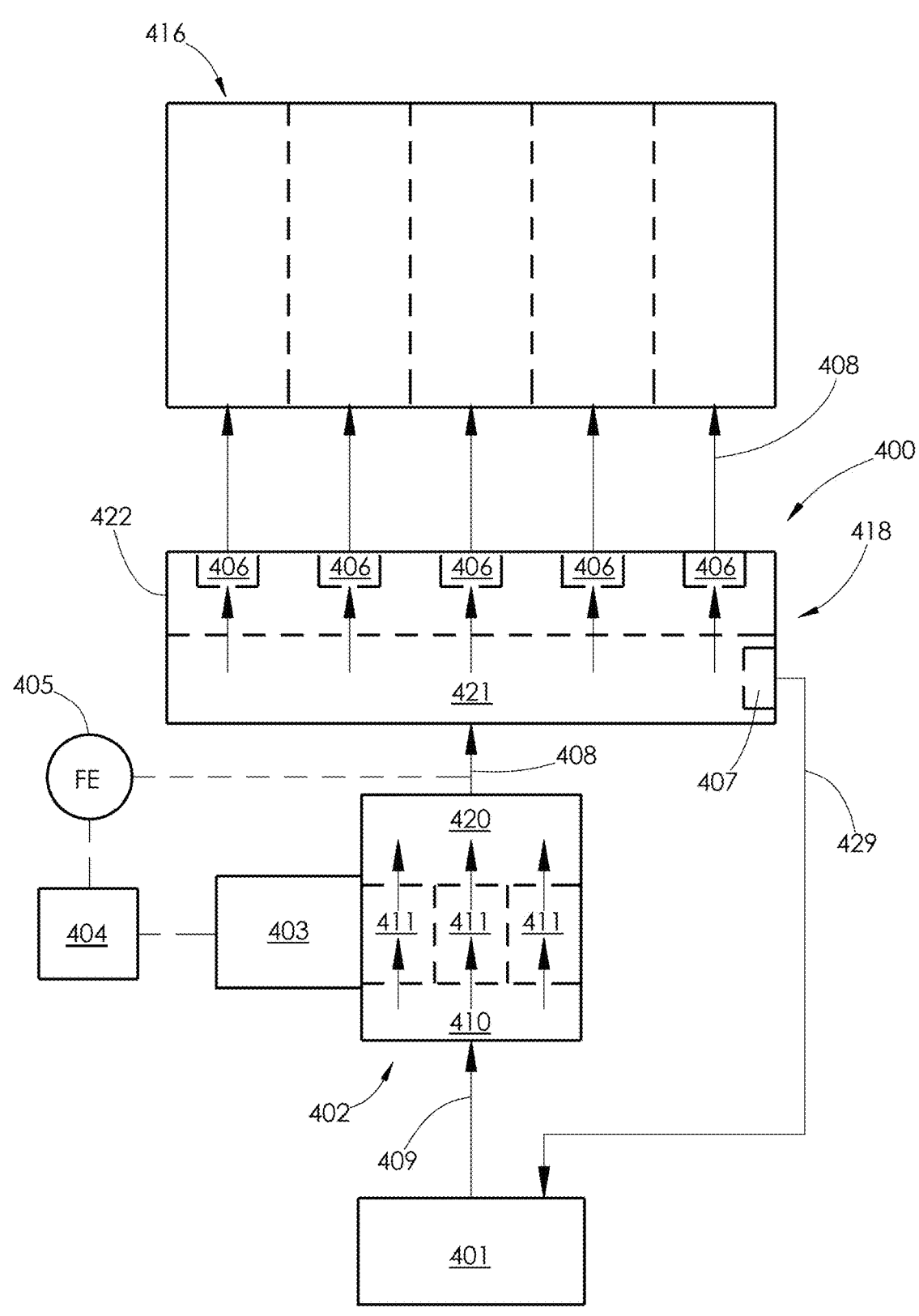
FIG. 11 is a top plan view of another embodiment of a lubrication system.
Figure 12:
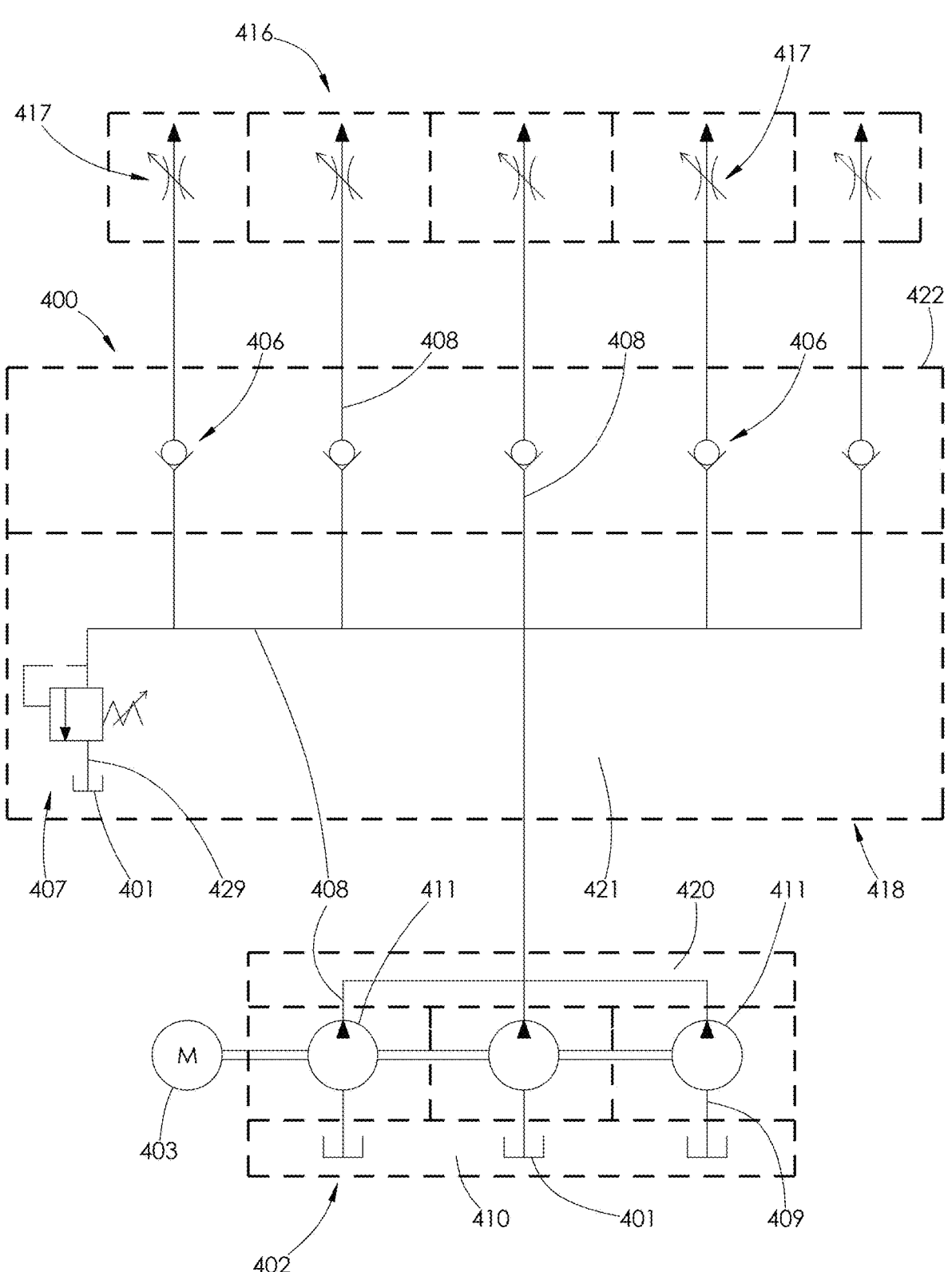
FIG. 12 is a hydraulic schematic view of the lubrication system shown in FIG. 11. The physical components of the lubrication system are shown in dashed lines.

Referring now to FIGS. 11-12, another embodiment of a lubrication system 400 is shown. The lubrication system 400 comprises a lubricant reservoir 401, a pump 402, a pump drive 403, a pump drive controller 404, one or more sensors 405, a plurality of high-pressure conduits or high-pressure hoses 408, a plurality of low-pressure conduits or low-pressure hoses 409, a low-pressure return conduit or low-pressure return hose 429, a check/relief manifold 418, and a lubricant or lubricating medium (not shown). The lubrication system 400 is configured to be connected to a fluid end 416. The lubricant used in this embodiment has a relatively low viscosity to encourage greater volume flow at lower system pressure. The lubricant may be many things such as a lubricating oil or a lubricating grease.

The pump 402 may be a positive displacement pump, and comprises an intake manifold 410, a plurality of plungers 411, and a discharge manifold 420. As with pump 302, lubricant enters the pump 402 via the intake manifold 410, from which all the plungers 411 draw lubricant, and discharges the pressurized lubricant into the common chamber or discharge manifold 420. Lubricant exits the pump 402 through a single outlet. A high-pressure hose 408 connects this single outlet and an inlet of the check/relief manifold 418.

The pump 402 differs from pump 302 in that the pump 402 has fewer plungers 411 than there are fluid end sections of the fluid end 416 that is being lubricated. In this embodiment, the pump 402 has three plungers 411 and the fluid end 416 has five fluid end sections.

The pump drive 403 is shown as an electric motor in this embodiment, however it may be a hydraulic motor, internal combustion engine, or any other type of driver. The schematic representation of the pump drive 403 as shown in FIG. 12 illustrates that a single pump drive 403 provides power to all the plungers 411 of the pump 402, as indicated by the connecting shaft between each schematic pump symbol 411.

The pump drive controller 404 receives output from the one or more sensors 405. Applying preprogrammed logic to the output, the pump drive controller 404 determines if the pump drive 403 should be on or off and sends the appropriate signal to the pump drive 403.

The one or more sensors 405 may measure any physical characteristic or physical parameter of the lubrication system 400 and/or high-pressure pump and/or the environment. In this embodiment, one sensor 405 is shown receiving one output from the high-pressure hose 408 between the pump

402 outlet and the check/relief manifold 418 inlet. Also in this embodiment, the sensor 405 shown in FIG. 11 is a volume flow sensor. As discussed above, there may be multiple sensors 405 measuring multiple things and providing multiple outputs to the pump drive controller 404.

The high-pressure hoses 408, low-pressure hoses 409, and low-pressure return hose 429 are similar to the high-pressure hoses 108, low-pressure hoses 109, and low-pressure return hose 129 in that they perform the same functions in the same manner. However, due to the differences in the lubrication system 400 from lubrication system 100, there may changes to the fit, form and/or number of hoses 408, 409, 429 as compared to the hoses 108, 109, 129 of lubrication system 100.

Referring now to FIG. 11, the check/relief manifold 418 comprises a body 422, a plurality of check valves 406, a pressure relief valve 407, and an intake manifold 421. In this embodiment, the plurality of check valves 406 and the pressure relief valve 407 are mounted to the exterior of the check/relief manifold 418 or installed internally within it. The check/relief manifold 418 is similar to check/relief manifold 318 in that it performs the same functions in the same manner. However, due to the difference in the lubrication system 400 from the lubrication system 300, there may be changes to the fit and/or form.

The check valves 406 are similar to check valves 306 in that they each comprise a guide stem, a body, legs, and an insert, and they perform the same function in the same manner, providing the same advantages as check valves 306. However, as a result of the changes to pump 402 as compared to pump 302, the check valves 406 may differ in fit or form from check valves 306. In this embodiment, there are the same number of check valves 406 as plungers in the fluid end 416 on a one-to-one basis.

The pressure relief valve 407 is similar to pressure relief valve 307 in that it performs the same function in the same manner. However, as a result of the changes to pump 402 as compared to pump 302, the pressure relief valve 407 may differ in fit or form from pressure relief valve 307.

To assemble the lubrication system 400, a low-pressure hose 409 connects the reservoir 401 to the pump 402. A single high-pressure hose 408 further connects the outlet of the discharge manifold 420 of the pump 402 to the inlet of the intake manifold 421 of the check/relief manifold 418. The check/relief manifold 418 is constructed so that the hydraulic circuits from the output of each plunger 411 to the inlet of each lubrication port on the fluid end 416 are not isolated from the other hydraulic circuits. High-pressure hoses 408 also connect the outlet of each check valve 406 to lubrication ports on the fluid end 416 on a one-to-one basis.

In this embodiment, the flow from the single pressure relief valve 407 exits the check/relief manifold 418 through a single low-pressure outlet. A low-pressure return hose 429 connects the single low-pressure outlet of the check/relief manifold 418 to the reservoir 401. The reservoir 401, pump 402, pump drive 403, pump drive controller 404, one or more sensors 405, and check/relief manifold 418 may be mounted on the same conveyance as the fluid end 416 separately or as a unit. Depending on the type of pump drive 403 used, the pump drive 403 may be mounted to the pump 402. Also, depending on the types of sensors 405 used, one or more sensors 405 may be mounted to the fluid end 416.

In operation, the one or more sensors 405 and the pump drive controller 404 are used to activate and deactivate and pump drive 403 in a similar fashion as the one or more sensors 105 and pump drive controller 104 are used to activate and deactivate pump drive 103. In this embodiment, the sensor 405 is a volume flow sensor measuring the volume of lubricant flow into the check/relief manifold 418. The measured value is used by the pump drive controller 404 to adjust the speed of the pump drive 403, thus increasing or decreasing lubricant flow to the check/relief manifold 418 and, by inference, flow to each plunger packing.

Referring now to FIG. 12, the hydraulic circuit for this embodiment shows that the lubricant pumped by the pump 402 is combined and delivered at a common pressure to the intake manifold 421 of the check/relief manifold 418. Since no two plunger packings are the same, there are different restrictions 417. The result of different restrictions 417 in this system is that the highest restriction 417 will receive the smallest amount of lubricant. However, setting the pressure relief valve 407 at the correct setting will facilitate adequate flow of lubricant to all the plunger packings. One advantage of this system is the reduction in cost by eliminating multiple pressure relief valves 407 and additional high-pressure hoses 408 as compared to lubrication systems 100, 200. Another advantage of this lubrication system 400 is that it allows a lubricant pump with any number of plungers to lubricate a high-pressure pump with any number of fluid end sections. The number of plungers in the pump does not have to equal the number of fluid end sections in the high-pressure pump.

Figure 13:
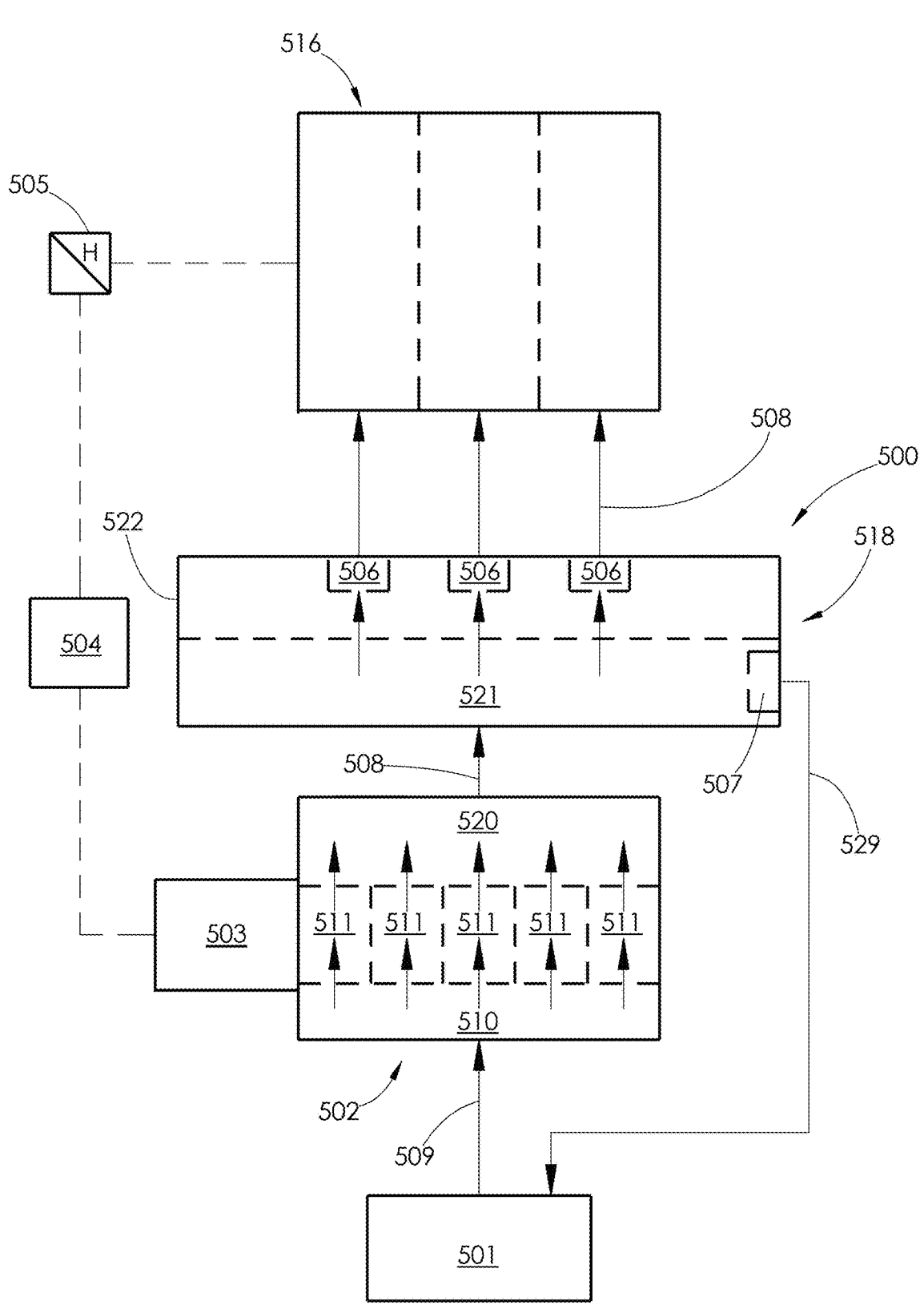
FIG. 13 is a top plan view of another embodiment of a lubrication system.
Figure 14:
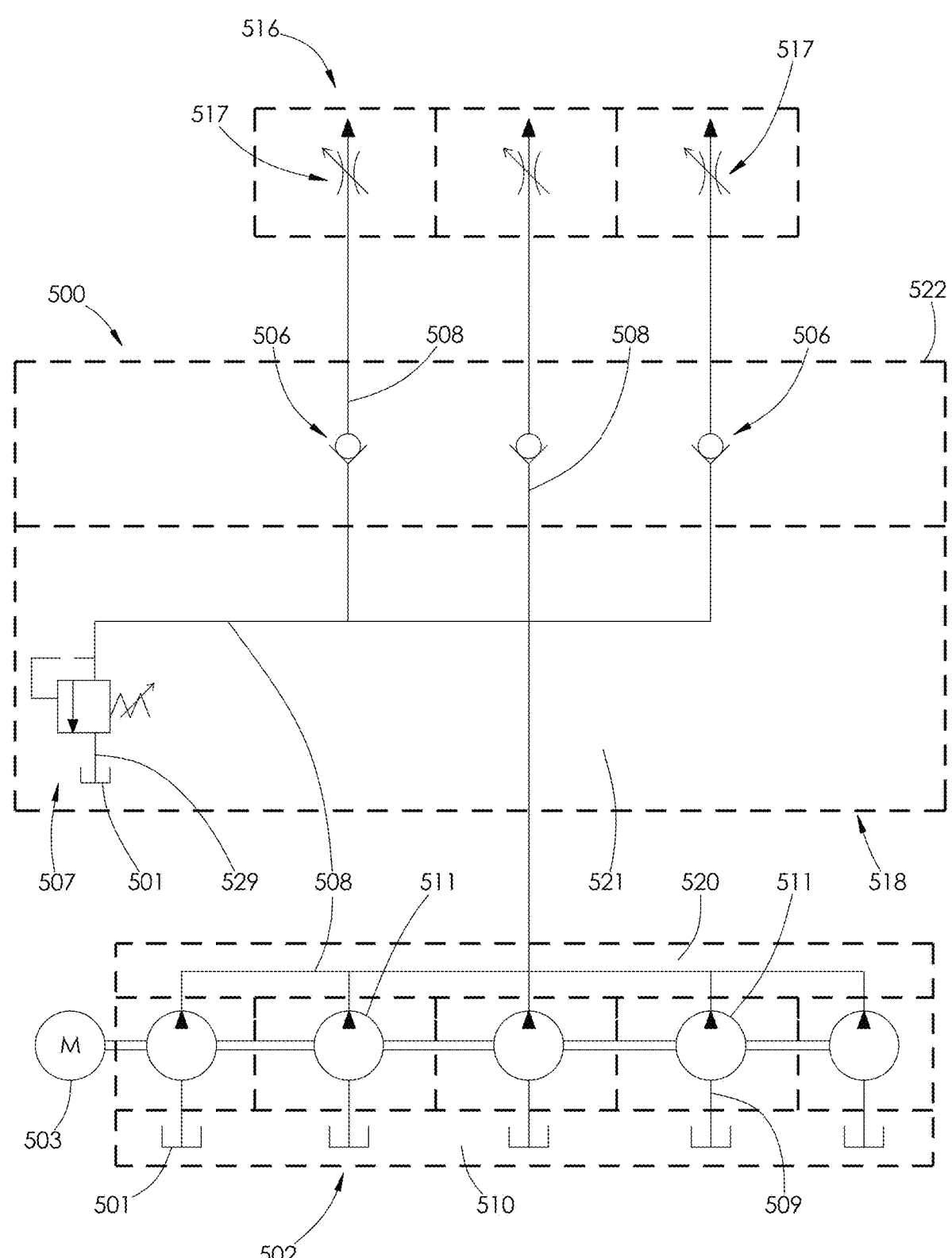
FIG. 14 is a hydraulic schematic view of the lubrication system shown in FIG. 13. The physical components of the lubrication system are shown in dashed lines.

Referring now to FIGS. 13-14, another embodiment of a lubrication system 500 is shown. The lubrication system 500 comprises a lubricant reservoir 501, a pump 502, a pump drive 503, a pump drive controller 504, one or more sensors 505, a plurality of high-pressure conduits or high-pressure hoses 508, a plurality of low-pressure conduits or low-pressure hoses 509, a low-pressure return conduit or low-pressure return hose 529, a check/relief manifold 518, and a lubricant or lubricating medium (not shown). The lubrication system 500 is configured to be connected to a fluid end 516. The lubricant used in this embodiment has a relatively low viscosity to encourage greater volume flow at lower system pressure. The lubricant may be may things such as a lubricating oil or a lubricating grease.

The pump 502 may be a positive displacement pump and comprises an intake manifold 510, a plurality of plungers 511, and a discharge manifold 520. The pump 502 is similar to the pump 302 in that it performs the same functions in the same manner. However, due to the differences in the lubrication system 500 from lubrication system 300, there may changes to the fit and/or form. The pump 502 has more plungers 511 than there are fluid end sections of the fluid end 516 that is being lubricated. In this embodiment, the pump 502 has five plungers 511 and the fluid end 516 has three fluid end sections.

The pump drive 503 is shown as an electric motor in this embodiment, however it may be a hydraulic motor, internal combustion engine, or any other type of driver. The schematic representation of the pump drive 503 as shown in FIG. 14 illustrates that a single pump drive 503 provides power to all the plungers 511 of the pump 502, as indicated by the connecting shaft between each schematic pump symbol 511.

The pump drive controller 504 receives output from the one or more sensors 505. Applying preprogrammed logic to the output, the pump drive controller 504 determines if the pump drive 503 should be on or off and sends the appropriate signal to pump drive 503.

The one or more sensors 505 may measure any physical characteristic or physical parameter of the lubrication system 500 and/or high-pressure pump and/or the environment. In this embodiment, one sensor 505 is shown measuring a characteristic of the fluid end 516. Also in this embodiment, the sensor 505 shown in FIG. 11 is a Hall effect sensor. As discussed above, there may be multiple sensors 505 measuring multiple things and providing multiple outputs to the pump drive controller 504.

The high-pressure hoses 508, low-pressure hoses 509, and low-pressure return hose 529 are similar to the high-pressure hoses 108, low-pressure hoses 109, and low-pressure return hose 129, in that they perform the same functions in the same manner. However, due to the differences in the lubrication system 500 from the lubrication system 100, there may changes to the fit, form and/or number of hoses 508, 509, 529 as compared to the hoses 108, 109, 129 of lubrication system 100.

Referring now to FIG. 13, the check/relief manifold 518 comprises a body 522, a plurality of check valves 506, a pressure relief valve 507, and an intake manifold 521. In this embodiment, the plurality of check valves 506 and the pressure relief valve 507 are mounted to the exterior of the check/relief manifold 518 or installed internally within it. The check/relief manifold 518 is similar to the check/relief manifold 418 in that it performs the same functions in the same manner. However, due to the difference in the lubrication system 500 from the lubrication system 400, there may be changes to the fit and/or form. One notable difference is that since the fluid end 516 being lubricated has only three fluid end sections, there are only three check valves 506 required.

The check valves 506 are similar to check valves 406 in that they each comprise a guide stem, a body, legs, and an insert, and they perform the same function in the same manner, providing the same advantages as check valves 406. However, as a result of the changes to the lubrication system 500 as compared to the lubrication system 400, the check valves 506 may differ in fit or form from the check valves 406. In this embodiment, there are the same number of check valves 506 as plungers in the fluid end 516 on a one-to-one basis.

The pressure relief valve 507 is similar to the pressure relief valve 407 in that it performs the same function in the same manner. However, as a result of the changes to lubrication system 500 as compared to lubrication system 400, the pressure relief valve 507 may differ in fit or form from pressure relief valve 407.

To assemble the lubrication system 500, a low-pressure hose 509 connects the reservoir 501 to the pump 502. A single high-pressure hose 508 further connects the outlet of the discharge manifold 520 of the pump 502 to the inlet of the intake manifold 521 of the check/relief manifold 518. The check/relief manifold 518 is constructed so that the hydraulic circuits from the output of each plunger 511 to each lubrication port on the fluid end 516 are not isolated from the other hydraulic circuits. High-pressure hoses 508 also connect the outlet of each check valve 506 to the lubrication ports on the fluid end 516 on a one-to-one basis.

In this embodiment, the flow from the single pressure relief valve 507 exits the check/relief manifold 518 through a single low-pressure outlet. A low-pressure return hose 529 connects the single low-pressure outlet of the check/relief manifold 518 to the reservoir 501. The reservoir 501, pump 502, pump drive 503, pump drive controller 504, one or more sensors 505, and check/relief manifold 518 may be mounted on the same conveyance as the fluid end 516 separately or as a unit. Depending on the type of pump drive 503 used, the pump drive 503 may be mounted to the pump 502. Also, depending on the types of sensors 505 used, one or more sensors 505 may be mounted to the fluid end 516.

In operation, the one or more sensors 505 and the pump drive controller 504 are used to activate and deactivate and pump drive 503 in a similar fashion as the one or more sensors 105 and pump drive controller 104 are used to activate and deactivate the pump drive 103. In this embodiment, the sensor 505 is a Hall effect sensor which detects the presence of the high-pressure pump plunger as the plunger passes the sensor 505, sending a signal to the pump drive controller 504. The pump drive controller 504 counts each instance a signal is received from the sensor 505 and activates and deactivates the pump drive 503 at preprogrammed values. For instance, after 1000 strokes of the plunger are detected, the pump drive 503 is activated. After another 100 strokes of the plunger are counted, the pump drive 503 is deactivated.

Referring now to FIG. 14, the hydraulic circuit for this embodiment shows that the lubricant pumped by the pump 502 is combined and delivered at a common pressure to the intake manifold 521 of the check/relief manifold 518. Since no two plunger packings are the same, there are different restrictions 517. The result of different restrictions 517 in this system is that the highest restriction 517 will receive the smallest amount of lubricant. However, setting the pressure relief valve 507 at the correct setting will facilitate adequate flow to all the plunger packings. One advantage of this system is the reduction in cost by eliminating multiple pressure relief valves 507 and multiple high-pressure hoses 508 as compared to the lubrication systems 100, 200. Another advantage of this lubrication system 500 is that it allows a lubricant pump with any number of plungers to lubricate a fluid end with any number of fluid end sections. The number of plungers in the pump does not have to equal the number of fluid end sections in the fluid end.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed. The systems described herein and their components may be described and sold as kits as well. The systems described herein may also include the fluid ends described herein, and may be sold as kits with the fluid ends.

The invention claimed is:

1. A lubrication system, comprising:

a lubricant reservoir configured to contain a lubricating medium;

a first pump connected to the lubricant reservoir, the first pump containing a plurality of reciprocating lubricant plungers each configured to move the lubricating medium through the lubricating system;

a fluid end of a separate second pump, the fluid end comprising at least one reciprocating fluid end plunger;

a plurality of check valves interconnecting the first pump and the fluid end;

at least one first conduit interconnecting the plurality of check valves and the first pump;

at least one pressure relief valve;

a second conduit interconnecting the at least one pressure relief valve and the lubricant reservoir; and a relief manifold;

in which the plurality of check valves and the at least one pressure relief valve are attached to the relief manifold.

2. The lubrication system of claim 1, in which the at least one pressure relief valve is a plurality of pressure relief valves.

3. The lubrication system of claim 2, further comprising a plurality of third conduits interconnecting the plurality of pressure relief valves and the second conduit.

4. The lubrication system of claim 1, in which each of the plurality of check valves comprises:

a guide stem;

a plurality of legs;

a body interconnecting the guide stem and the plurality of legs; and an insert situated within the body.

5. The lubrication system of claim 4, in which the insert is formed from an elastomeric substance.

6. The lubrication system of claim 4, in which the insert is formed from a urethane.

7. The lubrication system of claim 1, further comprising:

at least one sensor;

a pump drive connected to the first pump; and a pump drive controller;

in which the pump drive controller is configured to receive at least one output from the at least one sensor and selectively control whether the pump drive is activated or deactivated.

8. The lubrication system of claim 7, in which the at least one sensor is a pressure sensor.

9. The lubrication system of claim 7, in which the at least one sensor is configured to measure a physical characteristic of the at least one first conduit.

10. The lubrication system of claim 7, in which the at least one sensor is configured to measure a physical characteristic of the fluid end.

11. The lubrication system of claim 1, in which there are the same number of reciprocating lubricant plungers and check valves on a one-to-one basis.

12. The lubrication system of claim 1, in which the at least one reciprocating fluid end plunger is a plurality of reciprocating fluid end plungers; in which each check valve is configured to allow flow of the lubricating medium from the lubricant reservoir to a separate one of the reciprocating fluid end plungers on a one-to-one basis.

13. A lubrication system, comprising:

a lubricant reservoir configured to contain a lubricating medium;

a first pump configured to pressurize the lubricating medium, the first pump comprising at least one reciprocating plunger;

a pump drive connected to the first pump;

a sensor configured to measure a physical characteristic and provide an output;

a pump drive controller configured to selectively turn the pump drive on and off based on the output received from the sensor;

a plurality of check valves, each check valve comprising an elastomeric insert;

at least one first conduit interconnecting the first pump and the plurality of check valves;

at least one pressure relief valve;

a second conduit interconnecting the lubricant reservoir and the at least one pressure relief valve; and a relief manifold, in which the plurality of check valves and the at least one pressure relief valve are attached to the relief manifold;

in which the lubricant reservoir is configured to transmit the lubricating medium from the lubricant reservoir to a fluid end of a second pump through the plurality of check valves.

14. The lubrication system of claim 13, further comprising:

a suction valve installed within the first pump, the suction valve comprising an elastomeric insert; and a discharge valve situated within the first pump, the discharge valve comprising an elastomeric insert.

15. The lubrication system of claim 13, in which the physical characteristic is a pressure within the at least one first conduit.

16. The lubrication system of claim 13, in which the sensor is characterized as a first sensor, and in which the physical characteristic is characterized as a first physical characteristic, the lubrication system further comprising:

a second sensor configured to measure a second physical characteristic that is different than the first physical characteristic;

in which the pump drive controller is further configured to use the second physical characteristic to selectively turn the pump drive on and off.

17. The lubrication system of claim 13, in which the lubricating medium is a lubricating oil.

18. A kit, comprising:

the lubrication system of claim 13, and a fluid end which is the fluid end of claim 13.

19. The lubrication system of claim 13, in which each check valve has a diameter of 1.25 inches.

\* \* \* \* \*